S. Page.
Horse Hay-Fork.
№ 72321       Patented Dec. 17, 1867.
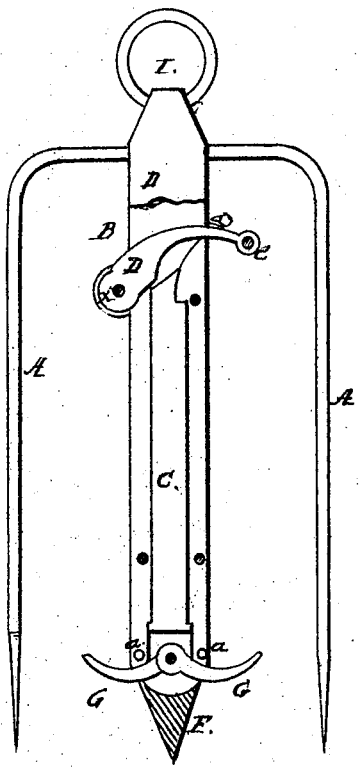
Witnesses:
A. H. Mann
Cornelius Coy
Inventor,
Saml. K. Page
her
Alexander H Mason
att

United States Patent Office.

SAMUEL PAGE, OF McALISTERVILLE, PENNSYLVANIA.

*Letters Patent No. 72,321, dated December 17, 1867.*

IMPROVEMENT IN HORSE HAY-FORKS.

*The Schedule referred to in these Letters Patent and making part of the same.*

TO ALL WHOM IT MAY CONCERN:

Be it known that I, SAMUEL PAGE, of McAlisterville, in the county of Juniata, and in the State of Pennsylvania, have invented certain new and useful Improvements in Hay-Forks; and do hereby declare that the following is a full, clear, and exact description thereof, reference being had to the accompanying drawings, and to the letters of reference marked thereon. In the annexed drawings, making part of this specification—

A A represent two tines of a hay-fork, running down from where these tines join at their centres; and terminating on a line with their points are two metallic bars B B, which are separated a little, and kept apart by suitable bolts or rivets. C represents a bar, which is placed between the bars B B, so as to play freely up and down between them, when necessary. This bar C is provided with a slot in its upper end, and has two teeth G G, pivoted to it at its lower end, as represented. D represents a lever, which is pivoted between two projections on the bars B B, near their upper ends, with one end passing through the slot in the upper end of bar C. When the loose end e of this lever is pressed downward, it forces down the bar C, which causes the teeth G G to be thrust out to each side of the bars B B between the pointed head H and the bolts a a, but when this lever is raised, it draws up the bar C, and causes the teeth G G to draw between the two bars B B, so that their points are obscured. A ring, I, is secured to the centre of the upper end of the fork, and a hole is made in the loose end e of lever D, into which a cord is entered for operating said lever, and causing to draw in the teeth G G for disengaging the load of hay.

In using this fork, it is first thrust into the hay, and the lever D is pressed downward, so as to cause the teeth G G to be thrown out to secure the hay to the fork. The fork is then liftted by ring I, and when the load is at its proper place in the mow or on the stack, the teeth G G are drawn in by a cord, which acts upon lever D, and the hay becoming thus disengaged, is dropped.

Having thus fully described my invention, what I claim, is—

The bar C, having a slot at its upper end, through which is passed the lever D, said bar being provided with the curved teeth G G, and used in combination with the bars B B, having pointed head H and tines A A, all operating as specified.

In testimony that I claim the foregoing, I have hereunto set my hand, this 31st day of October, 1867.

SAMUEL PAGE.

Witnesses:
  ELIHU BENNER,
  EDWARD M. HIBBS.